United States Patent
Youh et al.

(10) Patent No.: US 7,336,023 B2
(45) Date of Patent: Feb. 26, 2008

(54) COLD CATHODE FIELD EMISSION DEVICES HAVING SELECTIVE WAVELENGTH RADIATION

(76) Inventors: Meng-Jey Youh, 7F., No. 274-7, Rong-an 13th St., Jhongli City, Taoyuan County 320 (TW); Chih-Tsung Su, 4F., No. 157, Sanmin Rd., Sindian City, Taipei County 231 (TW); Cheuk-Wai Lau, 5F., No. 13, Alley 20, Lane 135, Sec. 2, Mincyuan E. Rd., Jhongshan District, Taipei City 104 (TW); Chun-Lung Tseng, No. 360, Jhongjheng Rd., Alian Township, Kaohsiung County 822 (TW); Yao-Hsien Joseph Huang, 485 W. Wistaria Ave., Arcadia, CA (US) 91007; Michelle Lin, 485 W. Wistaria Ave., Arcadia, CA (US) 91007

( * ) Notice: Subject to any disclaimer, the term of this patent is extended or adjusted under 35 U.S.C. 154(b) by 178 days.

(21) Appl. No.: 11/350,648

(22) Filed: Feb. 8, 2006

(65) Prior Publication Data

US 2007/0182300 A1    Aug. 9, 2007

(51) Int. Cl.
*H01J 5/16* (2006.01)
(52) U.S. Cl. ..................... 313/112; 313/496
(58) Field of Classification Search ............... 313/474, 313/479, 495, 496, 112
See application file for complete search history.

(56) References Cited

U.S. PATENT DOCUMENTS

| | | | |
|---|---|---|---|
| 4,142,126 A | 2/1979 | DuBois | |
| 5,543,685 A | 8/1996 | Okamoto et al. | |
| 5,559,397 A | 9/1996 | Tsuruoka et al. | |
| 5,606,462 A | 2/1997 | Tsuruoka et al. | |
| 5,767,620 A | 6/1998 | Onodaka | |
| 5,789,856 A | 8/1998 | Itoh et al. | |
| 5,838,106 A | 11/1998 | Funada | |
| 5,949,185 A | 9/1999 | Janning | |
| 6,013,983 A | 1/2000 | Asano et al. | |
| 6,034,474 A | 3/2000 | Ueoka et al. | |
| 6,066,917 A | 5/2000 | Funada | |
| 6,111,353 A | 8/2000 | Janning | |
| 6,111,354 A | 8/2000 | Fink et al. | |
| 6,320,309 B1 | 11/2001 | Nomura et al. | |
| 6,727,642 B1 * | 4/2004 | Cho et al. | 313/496 |
| 6,873,091 B2 | 3/2005 | Bechtel et al. | |
| 6,969,948 B2 | 11/2005 | Urabe et al. | |
| 2004/0100176 A1 | 5/2004 | Pichler | |
| 2005/0258728 A1 | 11/2005 | Matsuo et al. | |

* cited by examiner

*Primary Examiner*—Vip Patel
(74) *Attorney, Agent, or Firm*—Danton K. Mak; Sheldon Mak Rose & Anderson

(57) ABSTRACT

A lamp having a cold cathode field emission plate; an anode plate having a transparent substrate having a first side and a second side; a transparent conductive coating formed on the first side of the transparent substrate; a phosphor layer formed on the transparent conductive coating, and a filter formed on the second side of the transparent substrate; and a voltage source connected across the cathode and the anode plate.

26 Claims, 3 Drawing Sheets

COLD CATHODE FIELD EMISSION DEVICES HAVING SELECTIVE WAVELENGTH RADIATION

BACKGROUND

The present invention relates to a field emission device that produces light of selected wavelengths ranging from ultraviolet to infrared.

In recent years, there have been high expectations for the introduction of new types of lamps. Lamps emitting light in specific wavelength ranges are required in several different fields of use. For example, cold white light is desirable for car interior lamps, decorative office lamps, hospital lighting such as surgery lighting, and for Liquid Crystal Display (LCD) backlighting. Infrared (IR) light can be used in security, military and other night vision applications. Ultraviolet light can be used for skin tanning, counterfeit detection, exciting a photo-catalytic material, polymer curing, purification, and for sanitation.

White light lamps can emit a broad range of light with a wavelength from 400 nm to 700 nm. Although several lighting techniques have been developed to produce white light, such as fluorescent illumination, incandescent lighting, electro-luminescence and Light-Emitting Diodes (LED), those techniques have disadvantages.

Incandescent lamps generate visible light using a hot filament. The efficiency of incandescent lamps using filaments has not increased significantly for many years. When light is generated from an incandescent lamp, the filament generates significant heat through infrared radiation. Therefore, incandescent lamps require high power dissipation, are relatively inefficient and rapidly increase the temperature of the surrounding environment. Another problem of incandescent lamps is non-uniformity of illumination. It is hard to produce planar luminescence light.

Fluorescent lamps are operated by connecting a high voltage to two electrodes. Plasma, which is generated from the open discharge, creates Ultra-Violet (UV) radiation from mercury vapor in the lamp. Visible light is excited by the UV radiation from a phosphor coating on the inner surface of the lamp. Because of the mercury, fluorescent lamps cause pollution problems during manufacturing and recycling. It is also difficult to produce planar luminescence light.

Electro-Luminescence (EL) lamps suffer from low brightness and a short lifetime. Compared with incandescent lamps and fluorescent lamps, EL lamps have markedly lower brightness. Moreover, the brightness of EL lamps decreases over time. Typically, the brightness of an EL lamp decays about 50% after 1500 hours.

Light-Emitting Diodes (LED) cannot be flat. Additionally, the power consumption of LED's is comparable to or greater than electro-luminescence lamps and fluorescent lamps. Accordingly, it would be desirable to produce a cold white light lamp with low power dissipation, high brightness, and low heat generation to remedy the defects of the prior art.

For security applications, a near infrared spotlight is an ideal light source for a Charge Coupled Device (CCD) camera. Normally, the CCD camera has a sensitive range from 400-1000 nm. With a near-IR spotlight glow, near infrared light (from 750 to 930 nm) is generated. While near-IR light is a suitable light source for a CCD camera, near IR-light is not detectable by human eyes. Thus, such a lamp has broad application in security, military and other night vision fields.

A conventional near-IR spotlight has an incandescent lamp and an IR pass filter to create near-infrared light. However, the large amount of heat generated by the hot filament in the incandescent lamp leads to a short lifetime of the filter. There is a demand for lamps that produce infrared radiation without visible light or heat.

Conventional fluorescent lamps, incandescent lamps, and LED lamps can generate UV light, but have the drawbacks discussed above. Therefore, there exists a need for improved lamps that can produce desired UV light without visible light or IR light.

Field emission lamps are known. An exemplary structure of a field emission lamp is disclosed in U.S. Pat. No. 6,111,354, the contents of which are hereby incorporated herein by reference. A phosphor-coated anode and a field emission cathode are enclosed together in a panel. A voltage source is connected to the cathode and anode in a diode structure; or connected to the cathode, gate and anode in a triode structure. The field emission electrons are accelerated from cathode to anode. When electrons impact a phosphor layer on the anode, the phosphor is excited to luminescence. Field emission lamps are lightweight and have a high luminous efficiency, low power consumption, long lifetime, low working temperature, large panel size and planar structure.

However, a light source with a selective wavelength is desirable to improve upon the prior art.

SUMMARY OF THE INVENTION

In an embodiment, the present invention is directed to a lamp comprising a cold cathode field emission plate, an anode plate, and a voltage source connected across the cathode and anode plate. The anode plate has a transparent substrate having a first side and a second side; a transparent conductive coating formed on the first side of the transparent substrate; a phosphor layer formed on the transparent conductive coating, and a filter formed on the second side of the transparent substrate.

In a first embodiment of the present invention, the filter allows only white light to pass. In a second embodiment of the present invention, the filter allows only infrared light to pass. In a third embodiment of the present invention, the filter allows only ultraviolet light to pass.

The present invention is also directed to a method for making an anode plate having a transparent substrate for a field emission device. In an embodiment, the method comprises coating a transparent conductive coating on a first side of the transparent substrate; coating a phosphor layer on the transparent conductive coating; and coating an optical filter onto a second side of the transparent substrate.

BRIEF DESCRIPTION OF THE DRAWINGS

For a more complete understanding of the present invention, reference is now made to the following description taken in conjunction with the accompanying drawings, in which.

DETAILED DESCRIPTION OF THE PREFERRED EMBODIMENTS

In the following description, numerous specific details are set forth to provide a thorough understanding of the present invention. It will be obvious to those skilled in the art, however, that the present invention may be practiced without such specific details. In other instances, the present invention is based on the basic theory of field emission and the prior art of field emission lamps. The present invention discloses a planar field emission lamp for illuminating at selective light wavelengths from UV to IR. The field emission lamps according to the present invention provide the benefits of lightweight, high luminous efficiency, low power consumption, long lifetime, low working temperature, large panel size and planar structure.

Figure 1:
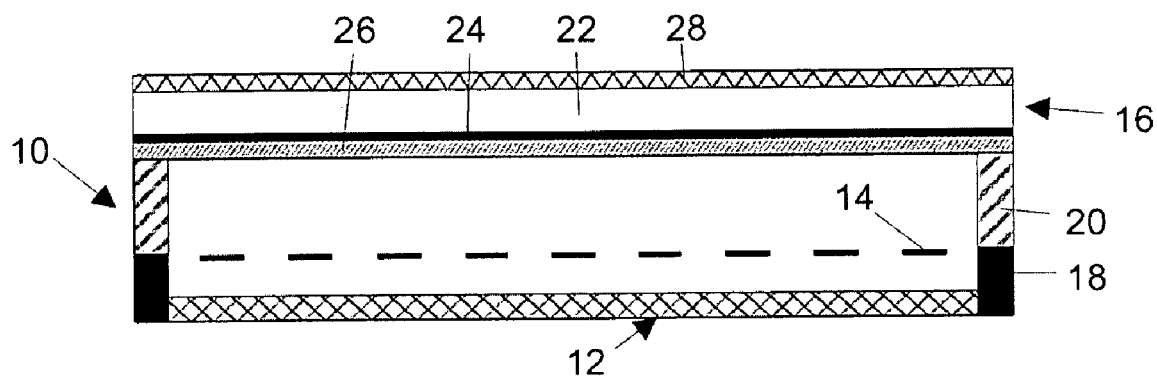
FIG. 1 is a cross sectional view of a lamp according to a first embodiment of the present invention.

Referring now to the drawings wherein depicted elements are not necessarily shown to scale. FIG. 1 shows the structure of a field emission lamp 10 according to a first embodiment of the present invention. In the lamp 10, a cathode 12, a gate 14 and an anode 16 are arranged in a triode structure. A first spacer 18 maintains proper spacing between the cathode 12 and the gate 14. A second spacer 20 maintains proper spacing between the gate 14 and the anode 16. A voltage source (not shown) is connected between the cathode 12 and the anode 16.

A typical triode cathode 12 has sharp metal or silicone tip emitters (not shown) which cause electrons to be drawn off, or emitted. The present invention may utilize sharp metal or silicone tip emitters. Additionally, the present invention can use a cathode 12 with a low work function material. The low work function material may be, for example, Carbon Nano-Tube (CNT), Diamond Like Carbon (DLC), diamond, AlN or AlGaN. $LaB_6$, Si, or Mo can also be used.

In order to fabricate a cathode 12 for use with the present invention, a first conductive layer, which can be Ni, Cu, Ag, Co, Fe, or one of the other conductive metals, is deposited on a substrate. Subsequently, a masking material is randomly sprayed onto the first conductive layer. The spraying may be done by such methods as dusting, sprinkling, or smoking. The masking material can be photosensitive material, plastic, glass, metal or ceramic particles which can be removed in a later step. The masking material can be in a form of solid particles or liquid droplets, or a combination.

After the masking material spraying process, an insulating layer and a second conductive layer for the gate are deposited to form the triode field emission emitters. The masking material is then removed, such as by water, solvents, or developers in an ultrasonic bath or other process known in the art, leaving openings in the insulating layer and second conductive layer. The resulting triode field emission emitters are then randomly distributed. Subsequently, an emitter material can be deposited in the openings, in electrical contact with the first conductive layer. The deposition process can be printing (such as inkjet printing or screen-printing), spin-coating, or direct growth, depending on the material of the first conducting layer.

As shown in FIG. 1, the anode 16 has a transparent substrate 22, a transparent conductive thin film coating 24 and a phosphor layer 26. An optical filter 28 is applied to the transparent substrate 22 to obtain precise wavelengths of light from the lamp 10. The transparent substrate 22 can be made from, for example, plastic, glass, quartz and $Al_2O_3$.

The transparent conductive thin film coating 24 may be made of, for example, Indium Tin Oxide (ITO) or ZnO. The transparent conductive thin film coating 24 provides electrical conductivity and does not decrease the transparency of the substrate. Preferably, the transparent conductive layer is prepared before the phosphor layer 26 is coated. The transparent conductive layer may be coated on the transparent substrate using, for example, a sol-gel method, sputtering coating, or evaporation coating.

The phosphor layer 26 may be coated onto the thin film coating 24 using a common printing technique such as screen printing, ink-jet printing, a sol-gel process, electrophoretic deposition, sedimentation, and spin coating. The quality of the phosphor layer 26 printing is an important factor in the luminescence quality of the phosphor screen and therefore the lamp. The phosphor materials are chosen depending on the desired wavelength range of radiation from the lamp. The deposition of the phosphor layer 26 will be described further in the examples below.

The optical filter 28 is a coating layer that is used to allow a desired wavelength range of light to pass through while blocking undesirable wavelengths of light. The optical filter preferably utilizes a multilayer coating. The optical filter can consist of organic dye and/or inorganic dye. The inorganic dye can be incorporated in the transparent substrate 22. Organic dye can be coated on the transparent substrate 22 by spin-coating or printing. The multilayer structure may include compounds selected from the group consisting of $TiO_2$, $Ta_2O_5$, $SiO_2$, $ThF_4$, $ThO_2$, $AlF_3$, $LaF_3$, $NdF_3$, $ZrO_2$ and $Na_3AlF_6$.

The gate 14 is formed to surround the cathode and to provide an extraction potential. The electrons are extracted by applying a voltage to the gate 14. Once electrons are extracted from the emitters on the cathode 12, the electrons are accelerated toward the anode 16 by a fixed electric field. Light is excited from the phosphor layer 26 by the accelerated electrons.

Figure 2:
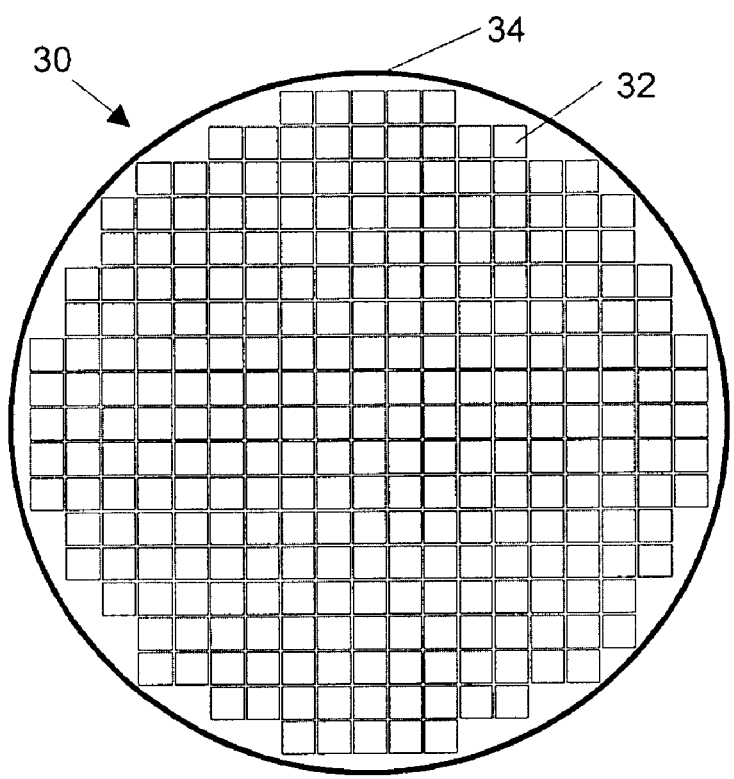
FIG. 2 is a plan view of a large area panel for a field emission lamp according to the present invention.
Figure 3:
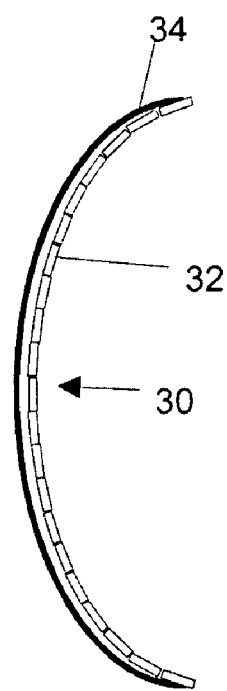
FIG. 3 is a side view of the lamp of FIG. 2.

The present invention can be used to fabricate a lamp for lighting a large area. The present invention makes it easier to fabricate individual field emission cells in a smaller package. For example, a spotlight 30 with a tilt panel structure is shown in FIGS. 2 and 3. The spotlight 30 has many individual field emission elements 32 in a specially oriented array. Each single field emission element 32 is a full function vacuum package. The spotlight 30 is configured with a particular number and arrangement of the emission elements 32 and is adjusted to fit the shape of a spotlight holder 34. The focal point of the spotlight 30 can be adjusted by the shape of spotlight holder 34. The panel size can be changed depending on the size of the spotlight holder 34.

For a better understanding of the present invention, examples of specific embodiments of the invention are given below.

EXAMPLE 1

There is a demand for lamps that produce infrared radiation but not visible radiation. Infrared lamps illuminate an area or a room without being detectible by human eyes. An infrared lamp can be used to provide radiation detectible by a CCD or CMOS image sensor. This application can be used for security, military or other night vision applications.

A field emission lamp emitting light in a near-infrared range radiation is fabricated to have a structure similar to that discussed above with reference to FIG. 1. The anode plate of the field emission lamp is manufactured in the following steps. An optical filter with a near-infrared light band pass is formed on an outer surface of the transparent substrate. A transparent conductive ITO or ZnO film is formed on an inner surface of the transparent substrate via a sputtering coating, evaporation coating or sol-gel method.

A phosphor layer is formed on the ITO or ZnO film. The phosphor layer can be formed by screen-printing, sol-gel process, electrophoretic deposition method, sedimentation method and spin coating method. The thickness of phosphor layer is 0.1 ~100 μm, and preferably 0.2 ~30 μm. Preferably, the IR emitting phosphor material is at least one of the phosphors listed in TABLE 1.

TABLE 1

| | |
|---|---|
| $InBO_3$:Cr,Eu | CdS:Ag |
| $InBO_3$:Cr | $BaSO_4$:Na,Sn |
| ZnS:Tm,Ag | $SrSO_4$:Na,Sn |
| YAG:Eu,Cr | $Gd_2O_2S$:Na,Sn |

Figure 4:
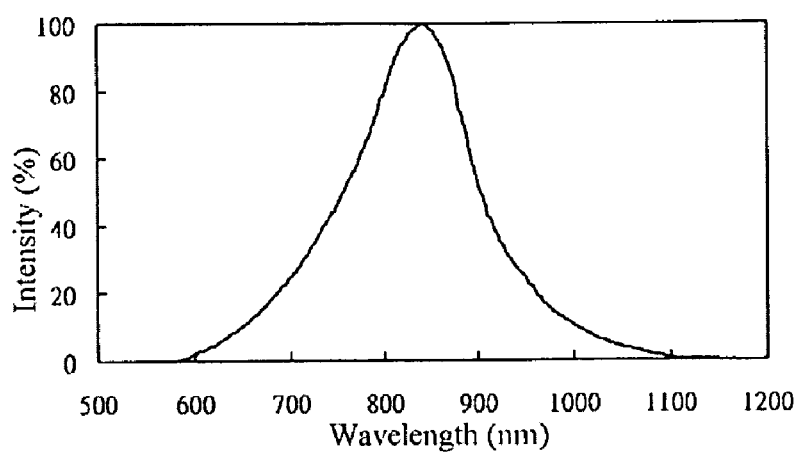
FIG. 4 shows a spectrum of an IR light producing phosphor usable with the present invention.

FIG. 4 shows the emission spectrum of the infrared phosphor $SrSO_4$:Na,Sn. $SrSO_4$:Na,Sn has a broadband emission from 600 to 1100 nm radiation. Because of the emission wavelength below 700 nm, unfiltered radiation from $SrSO_4$:Na,Sn can be detected by human eyes.

Figure 5:
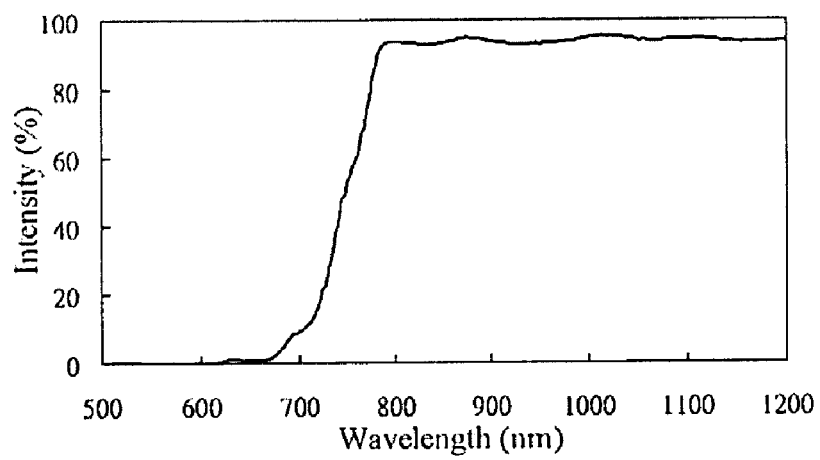
FIG. 5 shows a spectrum of an IR pass edge filter usable with the present invention.
Figure 6:
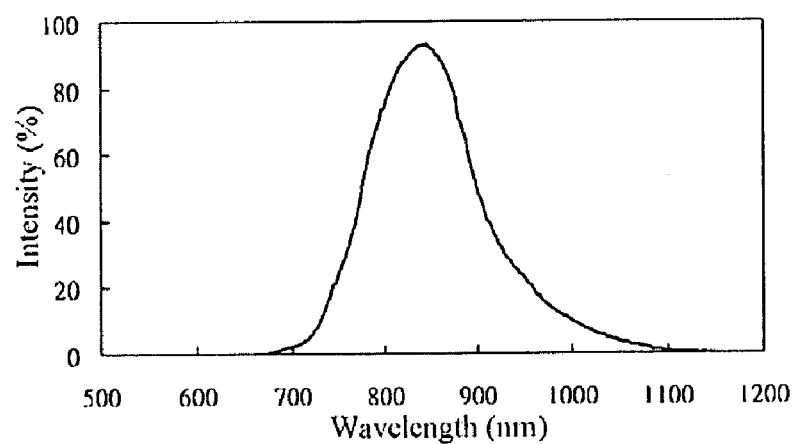
FIG. 6 illustrates the spectrum of IR radiation from the phosphor through an IR pass filter.

FIG. 5 shows the spectrum of an infrared pass optical filter suitable for use with the present invention. The filter blocks visible light and allows infrared light to pass through. Only the desirable light emitted from the infrared phosphor is passed through the infrared pass filter. The spectrum obtained is illustrated as FIG. 6. The light from the field emission lamp is detectible by a CCD or CMOS, without any visible light emissions. This is suitable for security, military or other night vision situation. A composition suitable for use as an infrared pass optical filter is listed in TABLE 2.

TABLE 2

| Layer | Material | Thickness (nm) |
|---|---|---|
| | Air | |
| 1 | $TiO_2$ | 33 |
| 2 | $SiO_2$ | 103 |
| 3 | $TiO_2$ | 65 |
| 4 | $SiO_2$ | 103 |
| 5 | $TiO_2$ | 65 |
| 6 | $SiO_2$ | 103 |
| 7 | $TiO_2$ | 65 |
| 8 | $SiO_2$ | 103 |
| 9 | $TiO_2$ | 65 |
| 10 | $SiO_2$ | 103 |
| 11 | $TiO_2$ | 65 |
| 12 | $SiO_2$ | 103 |
| 13 | $TiO_2$ | 65 |
| 14 | $SiO_2$ | 103 |
| 15 | $TiO_2$ | 65 |
| 16 | $SiO_2$ | 103 |
| 17 | $TiO_2$ | 65 |
| 18 | $SiO_2$ | 103 |
| 19 | $TiO_2$ | 65 |
| 20 | $SiO_2$ | 103 |
| 21 | $TiO_2$ | 33 |
| | Transparent substrate | |

Figure 7:
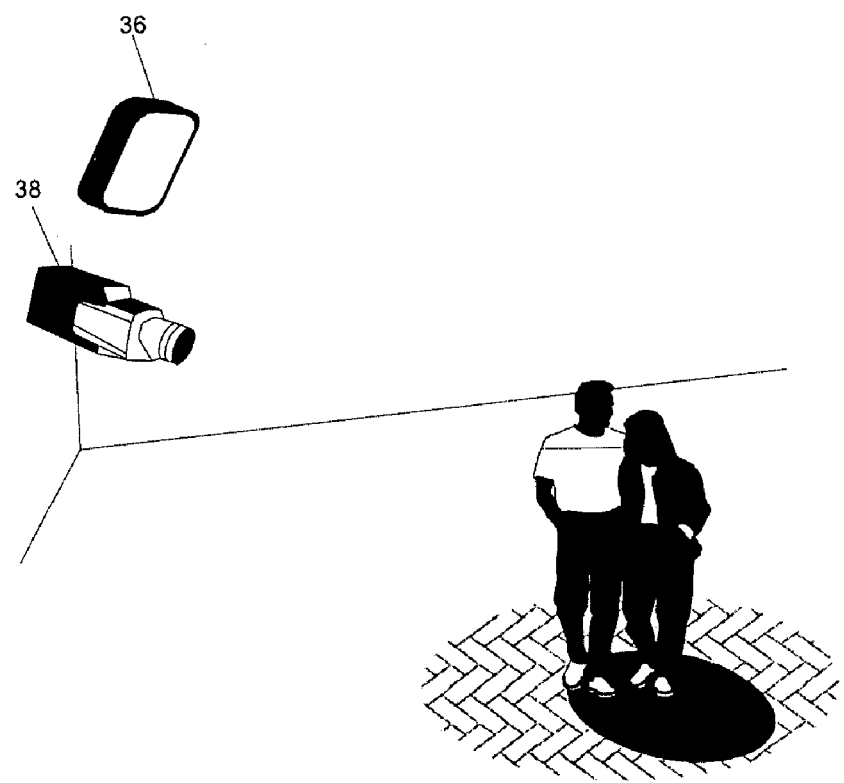
FIG. 7 is an illustration of a security system utilizing an infrared lamp according to an embodiment of the present invention.

FIG. 7 shows a security system employing a field emission lamp according to an embodiment of the present invention. The system utilizes an IR spotlight 36 having a field emissions lamp emitting near-infrared radiation. A camera 38 has a CCD or CMOS detector for detecting light at near-infrared range. The IR spotlight 36 can provide sufficient brightness for the camera 38 without disturbing a passerby or car driver.

EXAMPLE 2

There is a demand for lamps that produce visible radiation but not infrared radiation. It is sometimes desirable to illuminate an area or a room without increasing the temperature. Lamps of this nature are desirable in surgery applications.

An anode plate for a field emission lamp for emitting radiation in the cold white light range is fabricated as follows. An optical filter with a visible light band pass is formed on an outer surface of the transparent substrate. A composition suitable for use as a white light pass optical filter is listed in TABLE 3.

TABLE 3

| Layer | Material | Thickness (nm) |
|---|---|---|
| | Air | |
| 1 | $SiO_2$ | 124 |
| 2 | $TiO_2$ | 20 |
| 3 | $SiO_2$ | 58 |
| 4 | $TiO_2$ | 34 |
| 5 | $SiO_2$ | 51 |
| 6 | $TiO_2$ | 32 |
| 7 | $SiO_2$ | 55 |
| 8 | $TiO_2$ | 32 |
| 9 | $SiO_2$ | 55 |
| 10 | $TiO_2$ | 34 |
| 11 | $SiO_2$ | 53 |
| 12 | $TiO_2$ | 33 |
| 13 | $SiO_2$ | 54 |
| 14 | $TiO_2$ | 33 |
| 15 | $SiO_2$ | 46 |
| 16 | $TiO_2$ | 40 |
| 17 | $SiO_2$ | 42 |
| 18 | $TiO_2$ | 28 |
| 19 | $SiO_2$ | 189 |
| 20 | $TiO_2$ | 96 |
| 21 | $SiO_2$ | 152 |
| 22 | $TiO_2$ | 88 |
| 23 | $SiO_2$ | 146 |
| 24 | $TiO_2$ | 86 |
| 25 | $SiO_2$ | 142 |
| 26 | $TiO_2$ | 86 |
| 27 | $SiO_2$ | 141 |
| 28 | $TiO_2$ | 88 |
| 29 | $SiO_2$ | 143 |
| 30 | $TiO_2$ | 85 |
| 31 | $SiO_2$ | 147 |
| 32 | $TiO_2$ | 86 |
| 33 | $SiO_2$ | 158 |
| 34 | $TiO_2$ | 99 |
| 35 | $SiO_2$ | 171 |
| | Transparent substrate | |

The manufacturing process of the ITO film and the phosphor layers is performed as illustrated in EXAMPLE 1. The phosphor material used is a cold white light emitting phosphor material selected from those shown in TABLE 4.

TABLE 4

| | | |
|---|---|---|
| $Y_2O_2S$:Eu | ZnO:Zn | ZnS:Ag |
| $Y_2O_3$:Eu | $ZnGa_2O_4$:Mn | $ZnGa_2O_4$ |
| $YVO_4$:Eu | $Gd_2O_2S$:Tb | $BaMg_2Al_{16}O_{27}$:Eu |
| CdS:Ag | ZnCdS:Cu,Al | $BaMgAl_{10}O_{17}$:Eu |
| | ZnS:Cu, Al | $Sr_{10}(PO_4)_6Cl_2$:Eu |
| $Y_2O_3$:Tb | ZnS:Cu | ZnS:Ag,Al |

TABLE 4-continued

| | | |
|---|---|---|
| $Y_2O_3$:Tm | $Zn_2SiO_4$:Mn | $Y_2SiO_5$:Ce |
| $Y_2O_3$:Er | (Zn,Cd)S:Cu,Al | ZnS:Ag,Cu,Ga,Cl |
| $Y_2O_3$:Dy | $Y_2O_2S$:Tb | $(Ba,Sr)MgAl_{10}O_{17}$:Eu,Mn |
| $Zn_2SiO_4$:Ti | $Y_3Al_5O_{12}$:Ce | $(Sr,Ca,Ba,Mg)_{10}(PO_4)_6Cl_2$:Eu |
| $InBO_3$:Tb | $Y_3Al_5O_{12}$:Tb | |
| $InBO_3$:$Eu_3$: | $Y_3(Al,Ga)_5O_{12}$:Tb | |
| $Y_3Al_5O_{12}$:Tm | $Y_2SiO_5$:Tb | $Y_2O_2S$:Tb |
| $Gd_2O_3$:Eu | $LaPO_4$:Ce,Tb | $Zn_3(PO_4)_2$:Mn |
| $Y_3(Al,Ga)_5O_{12}$:Ce | | |
| $Y_3(Al,Ga)_5O_{12}$:Tm | | |
| $Y_2SiO_5$:Ce | | |
| $Y_2(Ge,Si)O_5$:Ce | | |

Because it is difficult to make broadband band white light using only one phosphor, a mixture of two or more phosphors may be used. For example, $Y_2O_2S$:Tb has a wide range of emission light and the emission peaks of this phosphor are 418 nm and 544 nm. White light can be obtained using the emission light from $Y_2O_2S$:Tb phosphor. Additionally, white light can be obtained by using the emission light from a mix of ZnS:Ag and (Zn,Cd)S:Cu,Al phosphor as well, because the emission peak of ZnS:Ag is 450 nm and the emission peak of (Zn,Cd)S:Cu,Al is 560 mm. The cold white light emitting phosphor material is therefore preferably at least one of the phosphors in TABLE 4.

The optical filter provides a pass band from about 400 nm to about 700 nm for visible white light, and blocks light outside this range. The optical filter protects the eyes of people exposed to the generated light from UV light, and will not increase the environment temperature because IR is blocked.

EXAMPLE 3

There is a demand for lamps that produce ultraviolet radiation, such as, from about 300 to about 400 nm wavelengths. Desired lamps generate UV light without visible and infrared radiation. When there lamps are used for counterfeit detection, the lamps reduce visible light emission interference during inspection by human eyes. Low wavelength UV light can also be blocked to protect human eyes.

An anode plate for a field emission lamp for emitting radiation in the ultraviolet light range is fabricated as follows. An optical filter film with a UV band pass is formed on the outer surface of the transparent substrate. A composition suitable for use as a UV band pass optical filter is listed in TABLE 5.

TABLE 5

| Layer | Material | Thickness (nm) |
|---|---|---|
| | Air | |
| 1 | $SiO_2$ | 29 |
| 2 | $ZrO_2$ | 65 |
| 3 | $SiO_2$ | 55 |
| 4 | $ZrO_2$ | 59 |
| 5 | $SiO_2$ | 81 |
| 6 | $ZrO_2$ | 56 |
| 7 | $SiO_2$ | 63 |
| 8 | $ZrO_2$ | 74 |
| 9 | $SiO_2$ | 38 |
| 10 | $ZrO_2$ | 54 |
| 11 | $SiO_2$ | 77 |
| 12 | $ZrO_2$ | 54 |
| 13 | $SiO_2$ | 77 |
| 14 | $ZrO_2$ | 54 |
| 15 | $SiO_2$ | 77 |
| 16 | $ZrO_2$ | 54 |
| 17 | $SiO_2$ | 77 |
| 18 | $ZrO_2$ | 54 |
| 19 | $SiO_2$ | 77 |
| 20 | $ZrO_2$ | 54 |
| 21 | $SiO_2$ | 77 |
| 22 | $ZrO_2$ | 54 |
| 23 | $SiO_2$ | 77 |
| 24 | $ZrO_2$ | 54 |
| 25 | $SiO_2$ | 9 |
| 26 | $ZrO_2$ | 4 |
| 27 | $SiO_2$ | 86 |
| 28 | $ZrO_2$ | 81 |
| 29 | $SiO_2$ | 42 |
| 30 | $ZrO_2$ | 82 |
| 31 | $SiO_2$ | 70 |
| 32 | $ZrO_2$ | 75 |
| | Transparent substrate | |

The manufacturing process of the transparent film and phosphor layers is performed as illustrated in EXAMPLE 1. The UV light emitting phosphor material is preferably selected those shown in TABLE 6.

TABLE 6

| | | |
|---|---|---|
| $BaSi_2O_5$:Pb | CaS:Pb | $SrB_4O_7$:Eu |
| $BaSi_2O_4$:Pb | CaO:Pb | $LaPO_4$:Ce |
| $Zn_2SiO_4$:Ti | $Y_2O_3$:Gd | $(LaCeTb)PO_4$:Tb |
| $ZnGa_2O_4$:Li,Ti | $HfO_2$:Ti | |
| $Y_2SiO_5$:Ce | LaOBr:Tm,Gd | $Y_3Al_5O_{12}$:Ce |
| $Y_2Si_2O_7$:Ce | $YPO_4$:Ce | $YAlO_3$:Ce |
| $MgAl_{11}O_{19}$:Ce | | $(BaSrMg)_3Si_2O_7$:Pb |

The optical filter provides a UV band pass from about 300 nm to about 400 nm. The optical filter protects human eyes from high energy UV light, and reduces the interference from visible light.

Although the present invention has been described in considerable detail with reference to certain preferred versions thereof, other versions are possible. Therefore, the spirit and scope of the appended claims should not be limited to the description of the preferred versions described herein.

All features disclosed in the specification, including the claims, abstracts and drawings, and all the steps in any method or process disclosed, may be combined in any combination except combination where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function, should not be interpreted as a "means" or "step" clause as specified in 35 U.S.C. §112.

What is claimed is:

1. A lamp comprising:
   a cold cathode field emission plate;
   an anode plate having:
      a transparent substrate having a first side and a second side;

a transparent conductive coating formed on the first side of the transparent substrate;

a phosphor layer formed on the transparent conductive coating, and a filter formed on the second side of the transparent substrate; and a voltage source connected across the cathode and anode plate.

2. The lamp of claim 1 wherein the transparent conductive coating is Indium Tin Oxide or ZnO.

3. The lamp of claim 1 wherein the filter allows only white light to pass.

4. The lamp of claim 1 wherein the phosphor layer comprises at least one visible light emitting phosphor.

5. The lamp of claim 4 wherein the phosphor layer comprises at least two visible light emitting phosphors.

6. The lamp of claim 3 wherein the at least one visible light emitting phosphor is selected from the group consisting of $Y_2O_2S:Eu$, $ZnO:Zn$, $ZnS:Ag$, $Y_2O_2:Eu$, $ZnGa_2O_4:Mn$, $ZnGa_2O_4$, $YVO_4:Eu$, $Gd_2O_2S:Tb$, $BaMg_2Al_{16}O_{27}:Eu$, $CdS:Ag$, $ZnCdS:Cu,Al$, $BaMgAl_{10}O_{17}:Eu$, $ZnS:Cu,Al$, $Sr_{10}(PO_4)_6Cl_2:Eu$, $Y_2O_3:Tb$, $ZnS:Cu$, $ZnS:Ag,Al$, $Y_2O_3:Tm$, $Zn_2SiO_4:Mn$, $Y_2SiO_5:Ce$, $Y_2O_3:Er$, $(Zn,Cd)S:Cu,Al$, $ZnS:Ag,Cu,Ga,Cl$, $Y_2O_3:Dy$, $Y_2O_2S:Tb$, $(Ba,Sr)MgAl_{10}O_{17}:Eu$, $Mn$, $Zn_2SiO_4:Ti$, $Y_3Al_5O_{12}:Ce$, $(Sr,Ca,Ba,Mg)_{10}(PO_4)_6Cl_2:Eu$, $InBO_3:Tb$, $Y_3Al_5O_{12}:Tb$, $InBO_3: Eu_3:$, $Y_3(Al,Ga)_5O_{12}:Tb$, $Y_3Al_5O_{12}:Tm$, $Y_2SiO_5:Tb$, $Y_2O_2S:Tb$, $Gd_2O_3:Eu$, $LaPO_4:Ce,Tb$, $Zn_3(PO_4)_2:Mn$, $Y_3(Al,Ga)_5O_{12}:Ce$, $Y_3(Al,Ga)_5O_{12}:Tm$, $Y_2SiO_5:Ce$, and $Y_2(Ge,Si)O_5:Ce$.

7. The lamp of claim 1 wherein the phosphor emits radiation in a wavelength range of from about 400 nm to about 700 nm.

8. The lamp of claim 1 wherein the filter comprises a multilayer optical thin film.

9. The lamp of claim 1 wherein the filter comprises organic dye, inorganic dye, or a combination of organic dye and inorganic dye.

10. The lamp of claim 1 wherein the filter comprises an optical thin film selected from the group consisting of $TiO_2$, $Ta_2O_5$, $SiO_2$, $ThF_4$, $ThO_2$, $AlF_3$, $LaF_3$, $NdF_3$, $ZrO_2$, $Na_3AlF_6$.

11. The lamp of claim 1 wherein the filter has a transparent band from about 400 to about 700 nm, and blocks emitted light having a wavelength below about 400 nm or above about 700 nm.

12. The lamp of claim 1 wherein the phosphor layer has a thickness of from about 0.2 μm to about 100 μm.

13. The lamp of claim 11 wherein the phosphor layer has a thickness of from about 0.5 μm to about 30 μm.

14. A lamp comprising:
a cold cathode field emission plate;
an anode plate having:
a transparent substrate having a first side and a second side;
a transparent conductive coating formed on the first side of the transparent substrate;
a phosphor layer formed on the transparent conductive coating, and
a filter formed on the second side of the transparent substrate; and
a voltage source connected across the cathode and anode plate;
wherein the filter allows only infrared light to pass.

15. The optical filter as recited in claim 14 wherein the filter has a transparent band for light having a wavelength higher than about 700 nm, and blocks light having a wavelength below about 700 nm.

16. The lamp of claim 14 wherein the phosphor layer comprises a phosphor emitting infrared radiation.

17. The lamp of claim 16 wherein the phosphor emits radiation in a wavelength range of from about 700 nm to about 1000 nm.

18. The lamp of claim 16 wherein the phosphor is selected from the group consisting of $InBO_3:Cr,Eu$, $CdS:Ag$, $InBO_3:Cr$, $BaSO_4:Na,Sn$, $ZnS:Tm,Ag$, $SrSO_4:Na,Sn$, $YAG:Eu,Cr$, and $Gd_2O_2S:Na,Sn$.

19. A lamp comprising:
a cold cathode field emission plate;
an anode plate having:
a transparent substrate having a first side and a second side;
a transparent conductive coating formed on the first side of the transparent substrate;
a phosphor layer formed on the transparent conductive coating, and
a filter formed on the second side of the transparent substrate; and
a voltage source connected across the cathode and anode plate;
wherein the filter only allows ultraviolet light to pass.

20. The lamp of claim 19 wherein the filter has a transparent band from about 300 to about 400 nm, and blocks light having a wavelength lower than about 300 nm or higher than about 400 nm.

21. The lamp of claim 19 wherein the phosphor layer comprises a phosphor selected from the group consisting of $BaSi_2O_5:Pb$, $CaS:Pb$, $SrB_4O_7:Eu$, $BaSi_2O_4:Pb$, $CaO:Pb$, $LaPO_4:Ce$, $Zn_2SiO_4:Ti$, $Y_2O_3:Gd$, $(LaCeTb)PO_4:Tb$, $ZnGa_2O_4:Li,Ti$, $HfO_2:Ti$, $Y_2SiO_5:Ce$, $LaOBr:Tm,Gd$, $Y_3Al_5O_{12}:Ce$, $Y_2Si_2O_7:Ce$, $YPO_4:Ce$, $YAlO_3:Ce$, $MgAl_{11}O_{19}:Ce$, and $(BaSrMg)_3Si_2O_7:Pb$.

22. The lamp of claim 19 wherein the phosphor layer comprises a phosphor emitting radiation in a wavelength range of from about 300 nm to about 410 nm.

23. A method for making an anode for a field emission device having a transparent substrate, the method comprising:
coating a transparent conductive coating on a first side of the transparent substrate;
coating a phosphor layer on the transparent conductive coating; and
coating an optical filter onto a second side of the transparent substrate.

24. The method of claim 23 wherein the optical filter has a transparent band from about 400 to about 700 nm, and blocks light having a wavelength below about 400 nm or higher than about 700 nm.

25. The method of claim 23 wherein the optical filter has a transparent band for light having a wavelength higher than about 700 nm, and blocks light having a wavelength below about 700 nm.

26. The method of claim 23 wherein the optical filter has a transparent band from about 300 to about 400 nm, and blocks light having a wavelength lower than about 300 nm or higher than about 400 nm.

* * * * *